(12) United States Patent
Nishimoto

(10) Patent No.: US 7,422,438 B2
(45) Date of Patent: Sep. 9, 2008

(54) BICYCLE WIRING CONNECTOR APPARATUS

(75) Inventor: Naohiro Nishimoto, Hashimoto (JP)

(73) Assignee: Shimano, Inc., Sakai-ku, Sakai (JP)

( * ) Notice: Subject to any disclaimer, the term of this patent is extended or adjusted under 35 U.S.C. 154(b) by 112 days.

(21) Appl. No.: 11/470,008

(22) Filed: Sep. 5, 2006

(65) Prior Publication Data

US 2007/0099442 A1   May 3, 2007

(30) Foreign Application Priority Data

Oct. 28, 2005   (JP) .............................. 2005-315229

(51) Int. Cl.
*H01R 33/00* (2006.01)

(52) U.S. Cl. ........................................ 439/34; 439/362

(58) Field of Classification Search ................... 439/34, 439/527, 564, 573, 589, 598, 607, 903
See application file for complete search history.

(56) References Cited

U.S. PATENT DOCUMENTS

| | | | |
|---|---|---|---|
| 5,470,277 A | 11/1995 | Romano | |
| 6,551,008 B1 | 4/2003 | Uchiyama | |
| 6,558,180 B2 | 5/2003 | Nishimoto | |
| 6,648,686 B2 | 11/2003 | Nishimoto | |
| 6,757,567 B2 | 6/2004 | Campagnolo et al. | |
| 6,848,930 B2 | 2/2005 | Fukuda | |
| 6,923,355 B2 | 8/2005 | Campagnolo | |
| 2003/0022743 A1 | 1/2003 | Meggiolan | |

*Primary Examiner*—Khiem Nguyen
(74) *Attorney, Agent, or Firm*—James A. Deland

(57) ABSTRACT

A bicycle wiring connector apparatus comprises a mounting portion and a connector portion. The mounting portion is structured to be mounted to an outer casing receiver of a bicycle, and the connector portion is retained to the mounting portion and is structured to retain an electrical connector.

25 Claims, 5 Drawing Sheets

BICYCLE WIRING CONNECTOR APPARATUS

BACKGROUND OF THE INVENTION

The present invention is directed to bicycles that use electrically operated devices and, more particularly, to a wiring connector apparatus used to fix electrical wiring to a bicycle frame.

In recent years, it has become common practice to equip bicycles with multiple electric devices. Examples of such electric devices include electrically operated front and rear transmission shifting devices, switch-controlled shift control devices, a power supply, and one or more additional electrically operated control devices. The front and rear transmission shifting devices usually are mounted to intermediate and rear portions of a bicycle, respectively, the shift control devices usually are mounted at opposite ends of a handlebar, and the power supply and additional control devices usually are mounted on a down tube or a seat tube of the bicycle frame. Wiring connectors often are used to interconnect the various electric devices together at various locations along the bicycle frame. Such an arrangement is shown in Japanese Laid-Open Patent Application No. 2003-040186. In that system, a wiring connector is attached to an end of wiring from a control device. The wiring connector includes three connectors for connecting wiring from the front and rear transmission shifting devices and from the shift control devices. The wiring connector is fixed to the underside of the bottom bracket (crank case) of the bicycle frame by means of bolt members that screw into the frame. However, such an arrangement requires screw holes to be specially formed in the frame. To avoid having to form such special structures on the frame, some installers fix the wiring connector to the frame using wire ties or other fixing structures. Unfortunately, it is difficult to stably fix the wiring connector to the frame using such fixing devices.

SUMMARY OF THE INVENTION

The present invention is directed to various features of a wiring connector apparatus. In one embodiment, a bicycle wiring connector apparatus is provided for mounting to an outer casing receiver on a bicycle frame, wherein the outer casing receiver has an outer casing receiving opening. The apparatus comprises a mounting portion structured to be mounted to the outer casing receiver, and a connector portion retained to the mounting portion and structured to retain an electrical connector. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
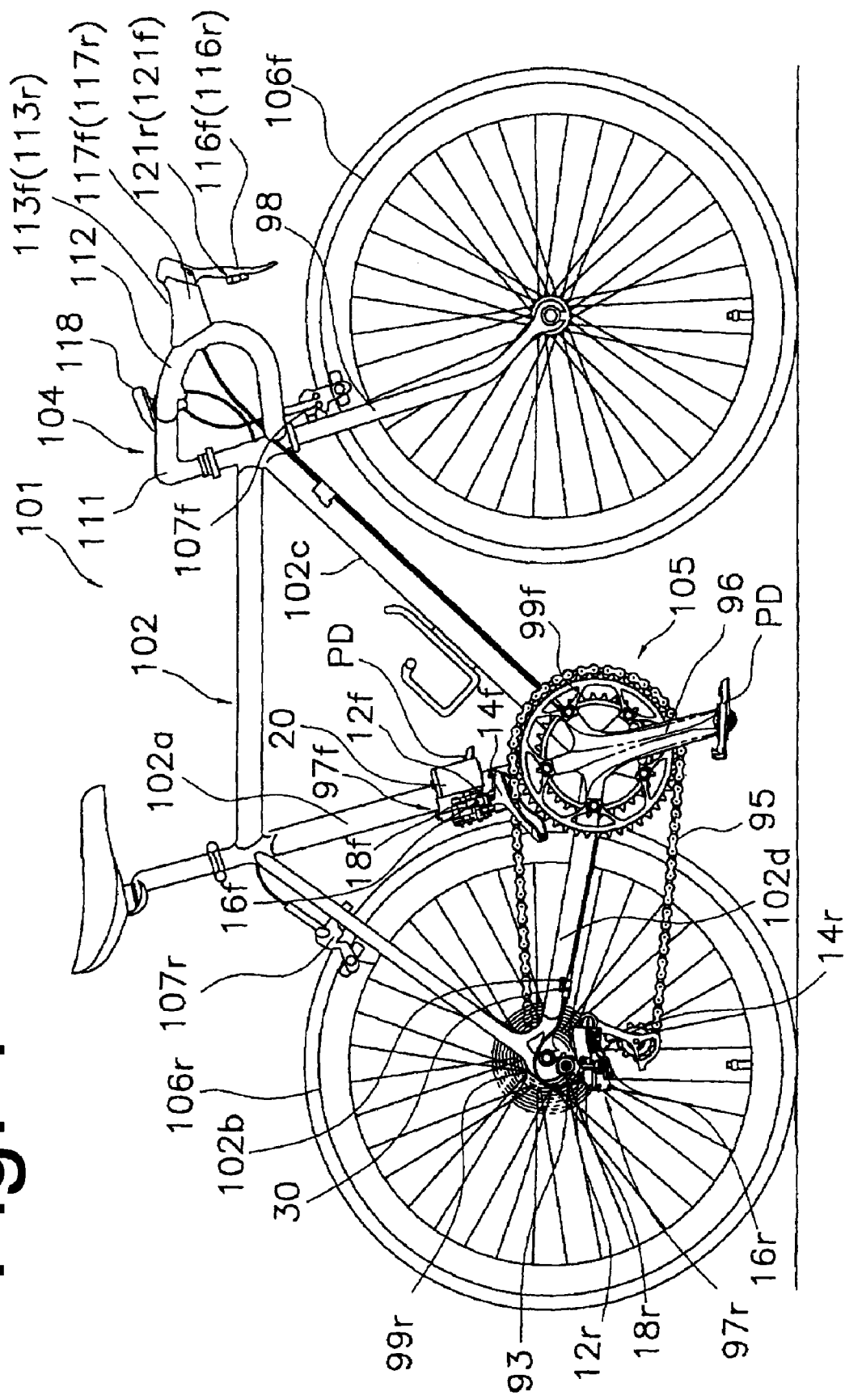
FIG. 1 is a side view of a particular embodiment of a bicycle.

FIG. 1 is a side view of a particular embodiment of a bicycle 101. Bicycle 101 is a road bicycle comprising a diamond-shaped frame 102, a front fork 98 rotatably mounted to frame 102, a handlebar assembly 104 mounted to the upper part of fork 98, a front wheel 106*f* rotatably attached to the lower part of fork 98, a rear wheel 106*r* rotatably attached to the rear of frame 102, and a drive unit 105. A front wheel brake 107*f* is provided for braking front wheel 106*f*, and a rear wheel brake 107*r* is provided for braking rear wheel 106*r*.

Drive unit 105 comprises a chain 95, a front sprocket assembly 99*f* coaxially mounted with a crank 96 having pedals PD, an electrically operated front derailleur 97*f* attached to a seat tube 102*a* of frame 102, a rear sprocket assembly 99*r* coaxially mounted with rear wheel 106*r*, and an electrically operated rear derailleur 97*r*. In this embodiment, front sprocket assembly 99*f* comprises two sprockets mounted coaxially with crank 96, and rear sprocket assembly 99*r* comprises ten sprockets mounted coaxially with rear wheel 106*r*. Front derailleur 97*f* moves to two operating positions to switch chain 95 between the two front sprockets, and rear derailleur 97*r* moves to ten operating positions to switch chain 95 among selected ones of the ten rear sprockets.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. Brake lever assemblies 113*f* and 113*r* are mounted at opposite sides of handlebar 112. Brake lever assembly 113*f* controls the operation of front wheel brake 107*f*, and brake lever assembly 113*r* controls the operation of rear wheel brake 107*r*. A display unit 118 is attached to a central portion of handlebar 112. Display unit 118 displays the speed of the bicycle, distance traveled, gear position, etc. in a known manner.

Figure 2:
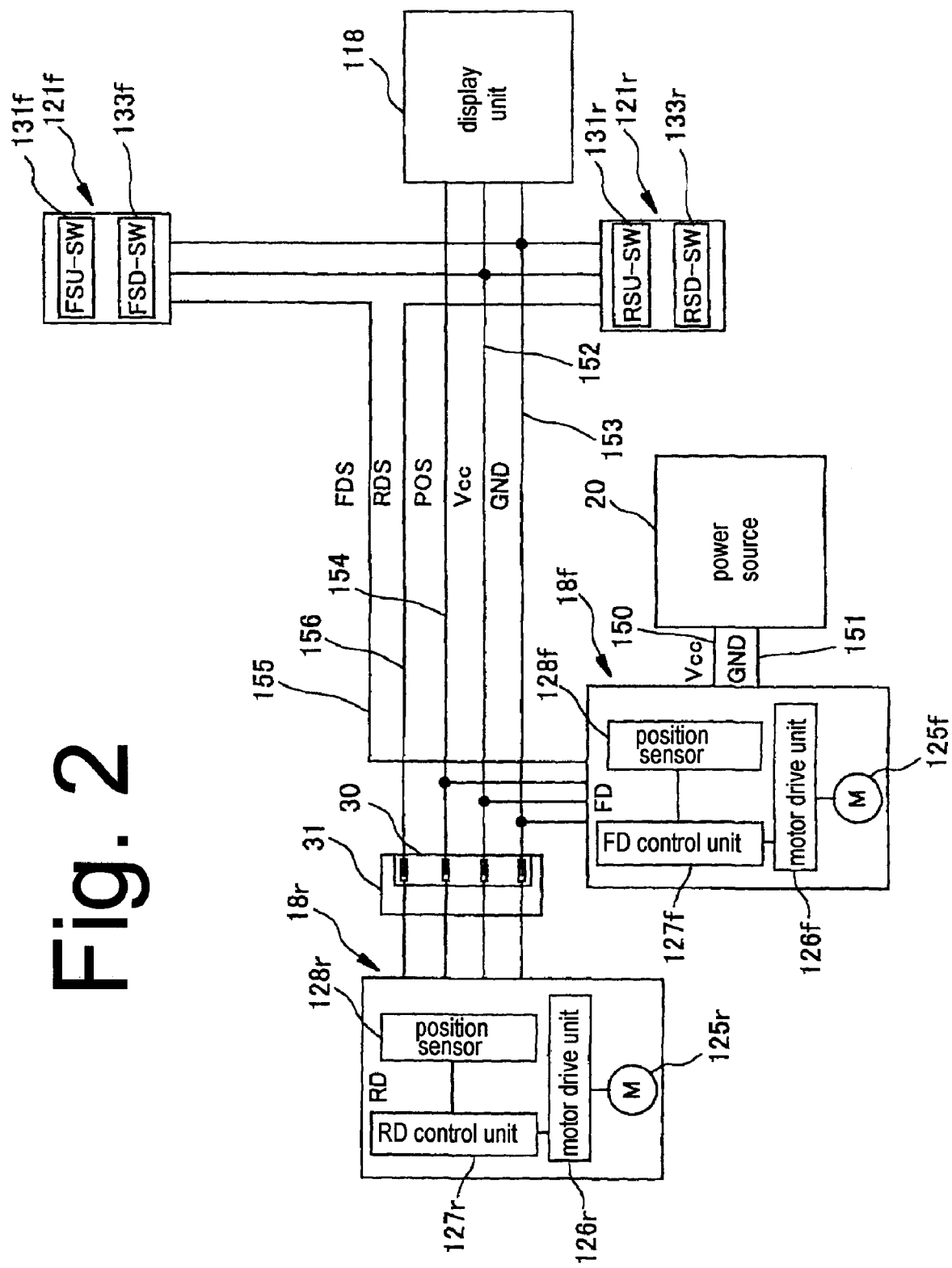
FIG. 2 is a schematic diagram of a particular embodiment of an electrically operated bicycle transmission system.

Brake lever assemblies 113*f* and 113*r* comprise respective brake brackets 117*f* and 117*r* mounted to the forward curved portions of handlebar 112, and respective brake levers 116*f* and 116*r* pivotably mounted to brake brackets 117*f* and 117*r*. A rear shift control device 121*r* is mounted to the rear side of brake lever 116*r* so that the rider may control the operation of rear derailleur 97*r* with the hand grasping brake lever 116*r*. Similarly, a front shift control device 121*f* is mounted to the rear side of brake lever 116*f* so that the rider may control the operation of front derailleur 97*f* with the hand grasping brake lever 116*f*. As shown in FIG. 2, a front upshift switch (FSU-SW) 131*f* and a front downshift switch (FSD-SW) 133*f* are mounted in front shift control device 121*f*, and a rear upshift switch (RSU-SW) 131*r* and a rear downshift switch (RSD-SW) 133*r* are mounted in rear shift control device 121*r*.

As shown in FIG. 1, front derailleur 97*f* includes a mounting member 12*f* mounted to seat tube 102*a*, a chain guide 14*f*, a coupling unit in the form of a four-bar link mechanism 16*f* that couples chain guide 14*f* to mounting member 12*f* so that chain guide 14*f* moves relative to mounting member 12*f*, an electric drive unit 18*f* that moves chain guide 14*f* via link mechanism 16*f*, and a power supply 20 that supplies electric power to drive unit 18*f* and to other components in the system. As shown in FIG. 2, drive unit 18*f* comprises a front derailleur motor 125*f* that may include a gear reduction unit, a front motor drive unit 126*f* for driving front derailleur motor 125*f*, a front derailleur control unit 127*f* that includes a programmed microprocessor and other electronic components for controlling the positioning of front derailleur 97*f* in response to signals received from front shift control device 121f, and a front position sensor 128f that senses the operating position of front derailleur 97f.

As shown in FIG. 1, rear derailleur 97r comprises a mounting member 12r fixed to a rear portion of a chain stay 102d of frame 102 by a fixing bolt 93, a chain guide 14r, a coupling unit in the form of a four-bar link mechanism 16r that couples chain guide 14r to mounting member 12r so that chain guide 14r moves relative to mounting member 12r, and an electric drive unit 18r that moves chain guide 14r via link mechanism 16r. As shown in FIG. 2, drive unit 18r comprises a rear derailleur motor 125r that may include a gear reduction unit, a rear motor drive unit 126r for driving rear derailleur motor 125r, a rear derailleur control unit 127r that includes a programmed microprocessor and other electronic components for controlling the positioning of rear derailleur 97r in response to signals received from rear shift control device 121r, and a rear position sensor 128r that senses the operating position of rear derailleur 97r.

Power supply 20 supplies electric power to front and rear derailleurs 97f and 97r, to front and rear shift control devices 121f and 121r, and to display unit 118. More specifically, power supply 20 supplies electric power having a power supply voltage Vcc (e.g., 6-8.4 VDC) to drive unit 18f of front derailleur 97f through a power supply ($V_{CC}$) line 150 and a ground (GND) line 151. Power supply 20 also supplies electric power to drive unit 18r of rear derailleur 97r, to display unit 118 and to front and rear shift control devices 121f and 121r through a power supply line 152 and a ground line 153 connected to drive unit 18f. Shift position signals (POS) from position sensors 128f and 128r are communicated to display unit 118 through a shift position signal line 154 so that the operating positions of front and rear derailleurs 97f and 97r may be displayed on display unit 118. Shift command signals FDS and RDS generated in response to the operation of shift control devices 121f and 121r, respectively, are communicated to front and rear derailleurs 97f and 97r through respective shift command signal lines 155 and 156. In this embodiment, the various signal lines are physically connected to drive unit 18f and then physically routed to drive unit 18r. For example, drive unit 18f of front derailleur 97f may be connected to display unit 118 and to front and rear shift control devices 121f and 121r through a five-wire cable that runs along down tube 102c and contains all of the signals shown in the middle portion of FIG. 2, and then drive unit 18f of front derailleur 97f is further connected to drive unit 18r of rear derailleur 97r through a four-wire cable that runs along chainstay 102d and contains all of the signals except for the front derailleur shift command signals FDS.

Figure 3:
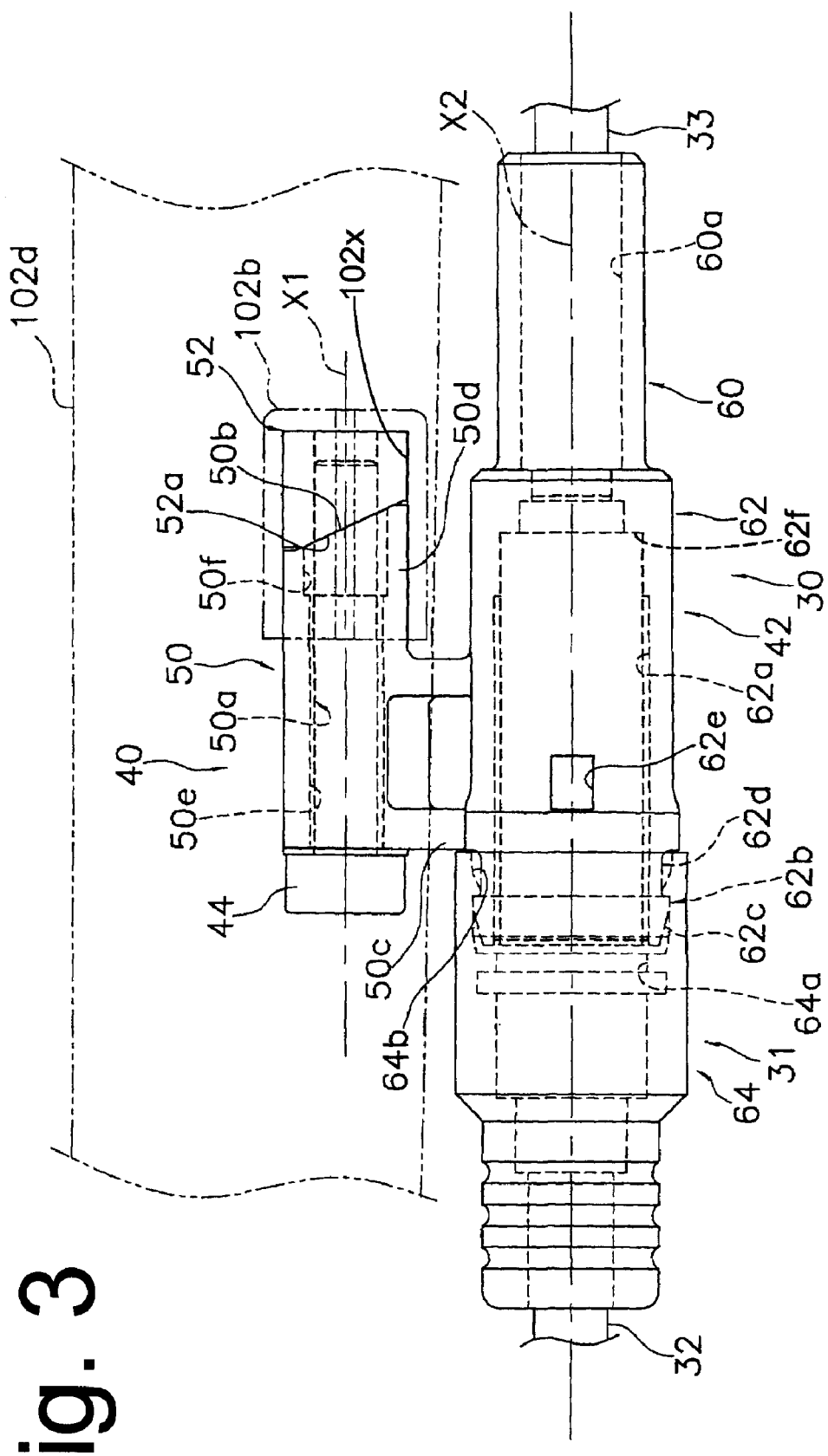
FIG. 3 is a side view of a particular embodiment of a wiring connector apparatus.

As shown in FIG. 1, a wiring connector apparatus 30 is provided in the middle of the wiring that connects drive unit 18r and drive unit 18f. The wiring connector apparatus 30 is fixed to a well known cylindrical outer casing receiver 102b that is fixed by welding or the like to a rear portion of chain stay 102d of frame 102 and usually terminates the outer casing of a Bowden cable. As shown in FIG. 3, connector apparatus 30 is provided at the end of a four-wire cable 33 that is connected to drive unit 18f of front derailleur, and a socket 31 is provided on the end of a four-wire cable 32 that is connected to drive unit 18r of rear derailleur 97r. Socket 31 is detachably mounted to connector apparatus 30 in a manner discussed below to electrically connect cable 32 to cable 33.

Figure 4:
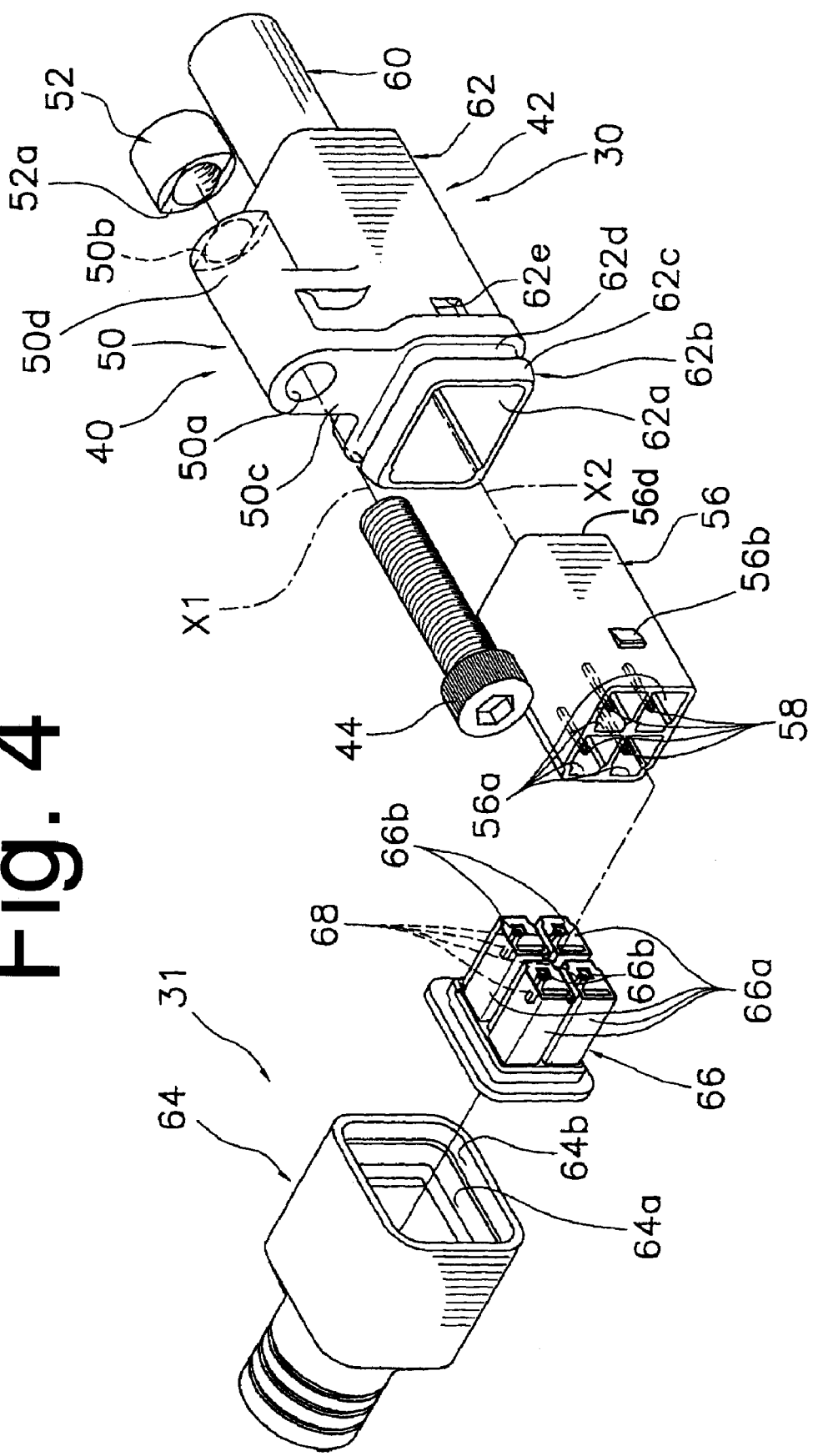
FIG. 4 is an exploded perspective view of the wiring connector apparatus.

As shown in FIGS. 3 and 4, connector apparatus 30 comprises a mounting unit 40 structured to be mounted to outer casing receiver 102b and at least one connector portion 42 retained to mounting unit 40 and structured to retain an electrical connector such as electrical connector 56. Mounting unit 40 comprises a mounting portion 50 with a cylindrical receiver mounting portion 50d having an outer diameter dimensioned to fit within an outer casing receiving opening 102x in outer casing receiver 102b, an opening 50a extending through receiver mounting portion 50d in a first direction along a horizontal axis X1, a first inclined surface 50b at one end of receiver mounting portion 50d (the right end in FIG. 3) so as to intersect opening 50a and axis X1, and a connecting portion 50c formed at a front portion of mounting portion 50 for connecting mounting portion 50 to connector portion 42.

A fastening unit 41 is provided to securely fasten mounting portion 50 to outer casing receiver 102b. Fastening unit 41 comprises a rotating member in the form of a hex socket head bolt member 44 and a pressing member in the form of a nut 52. Bolt member 44 extends through opening 50a. Nut 52 screws onto bolt member 44 and has an inclined surface 52a that faces and engages inclined surface 50b on mounting portion 50. As a result, nut 52 moves relative to receiver mounting portion 50d radially outwardly from axis X1 (upwards in FIG. 3) as bolt member 44 is tightened. As a result, receiver mounting portion 50d and nut 52 press against the inner peripheral surface of outer casing receiving opening 102x. In the embodiment shown in FIG. 3, receiver mounting portion 50d presses against the lower surface of outer casing receiving opening 102x while nut 52 presses against the upper surface of outer casing receiving opening 102x to form a friction fit that securely fastens mounting portion 50 to outer casing receiver 102b.

Opening 50a has a smaller diameter portion 50e and a larger diameter portion 50f, wherein larger diameter portion 50f is formed at the end where inclined surface 50b is formed. In this embodiment, the inner diameter of larger diameter portion 50f is significantly larger than the outer diameter of the screw portion of bolt member 44, and larger diameter portion 50f is configured so that bolt member 44 moves in a radial direction together with nut 52 when bolt member 44 is tightened. Larger diameter portion 50f is formed so that its length is approximately ¼ of the total length of mounting portion 50. For example, if bolt member 44 is a JIS M3 screw, then the inner diameter of larger diameter portion 50f of opening 50a is approximately 4 mm, while the inner diameter of smaller diameter portion 50e is approximately 3.6 mm.

Connector portion 50c of mounting portion 50 connects connector portion 42 to mounting portion 50. In this embodiment, connector portion 42 and mounting portion 50 are one piece to increase strength. Connector portion 42 comprises a wire containment case 60 and a connector case 62. Connector case 62 has a generally rectangular connector opening 62a with rounded corners dimensioned for receiving therein an electrical connector in the form of a contact case 56, a socket retaining portion 62b, and a retaining opening 62e. Socket retaining portion 62b has a tapered tip portion 62c and a constricted portion 62d behind tapered tip portion 62c. Socket retaining portion 62b and retaining opening 62e function in a manner described below. Wire containment case 60 includes a circular wiring containment opening 60a extending along an axis X2 that is parallel to axis X1 so that the wiring may be oriented parallel to frame 102. Wire containment opening 60a is dimensioned to receive the end portion of cable 33 therein.

Contact case 56 has a substantially rectangular cross section, with one vertical side in FIG. 4 being shorter than the other side, and with intermediate horizontal steps forming the transition between the shorter vertical side and the remainder of the contact case. Connector opening 62a of connector portion 42 has a complementary structure. This makes it possible to prevent assembly errors when inserting contact case 56 into connector case 62. Contact case 56 further includes four partitioned contact containment spaces 56a, each of which contains an electrically conductive contact 58. While each contact containment space 56a has a substantially rectangular cross section, one vertical side is shorter than the other side and has horizontal steps in the same manner as the overall shape of contact case 56 for reasons discussed below. A retaining projection 56b is formed on a side surface of contact case 56 for engaging retaining opening 62e in connector case 62 so that contact case 56 may be axially locked inside connector case 62. Further axial retaining is accomplished by contact between a rear surface 56d of contact case 56 and a radially inwardly projecting stepped surface 62f of connector case 62.

Each electrically conductive contact 58 may comprise a terminal member obtained by press-molding a thin sheet of conductive metal. More specifically, each contact 58 may comprise a tip having the shape of a tapered pin, and a crimping portion formed at the rear end to crimp an associated wire of cable 33 (i.e., power wire 152, grounding wire 153, position signal wire 154, and shift signal wire 156). Each contact 58 is disposed so that its tip is placed on the inner side of a corresponding contact containment space 56a.

As noted previously, socket 31 is fixed to the end of cable 32 from rear derailleur 97r. Usually, the manufacturer of rear derailleur 97r supplies the socket 31 together with cable 32. As shown in FIGS. 3 and 4, socket 31 comprises a socket case 64, an electrical connector in the form of a contact case 66 disposed within socket case 64, and a plurality of electrically conductive contacts 68 disposed within contact case 66. Socket case 64 includes a connector opening 64a that supports contact case 68 substantially axially immovably therein. For example, a rear surface of contact case 66 may abut against a radially inwardly projecting stepped surface in socket case 64 in a manner similar to contact case 56 and connector case 62. A retaining portion 64b having a complementary shape to retaining portion 62b of connector case 62 is formed at the outer edge of socket case 64 so that socket case 64 may engage connector case 62 in a locking manner.

Contact case 66 includes a plurality of (e.g., four) protruding contact containment portions 66a, each having a contact 68 mounted within a mounting opening 66b. Each contact containment portion 66a has a substantially rectangular cross section, with one vertical side being shorter than the other side and with horizontal steps to achieve a male/female connection with a corresponding contact containment space 56a in contact case 56 without connection errors. Each contact 68 is shaped to enable electrical connection with an associated contact 58 in contact case 56. For example, each contact 68 may comprise a terminal member press-molded from a thin sheet of conductive metal. Each contact 68 may comprise a tip having the shape of a tapered pin, and a crimping portion formed at the rear end to crimp an associated wire of cable 32 (i.e., power wire 152, grounding wire 153, position signal wire 154, and shift signal wire 156). Each contact 68 is disposed so that its tip is placed on the inner side of a corresponding mounting opening 66a.

Connector apparatus 30 thus configured may be mounted to frame 102 of bicycle 101 (e.g., to chain stay 102d) simply by attaching mounting unit 40 to outer casing receiver 102b disposed on chain stay 102d. For example, bolt member 44 may be passed through opening 50a in mounting portion 50, and the two inclined surfaces 50b and 52a of mounting portion 50 and nut 52, respectively, are engaged. Then, while nut 52 is loosely screwed onto bolt member 44, receiver mounting portion 50d and nut 52 are inserted into outer casing receiving opening 102x. Then, bolt member 44 is tightened. During this time, the inclined surfaces 50a and 52a prevent nut 52 from turning while also causing nut 52 to move relative to mounting portion 50 (e.g., mounting portion 50 and nut 52 move in opposite directions radially relative to axis X1) so that mounting portion 50 and nut 52 press against the inner peripheral surface of outer casing receiver 102b. This securely fastens connector apparatus 30 to outer casing receiver 102b. Since connector apparatus 30 uses an existing outer casing receiver 102b on frame 102, it is not necessary to provide special mounting structures on frame 102. As a result, electrically operated components may be more easily retrofitted to existing bicycles. Furthermore, since outer casing receiver 102b typically is securely fixed to frame 102 by welding or the like, connector apparatus 30 can be fixed to frame 102 of bicycle 101 in a very secure manner.

Figure 5:
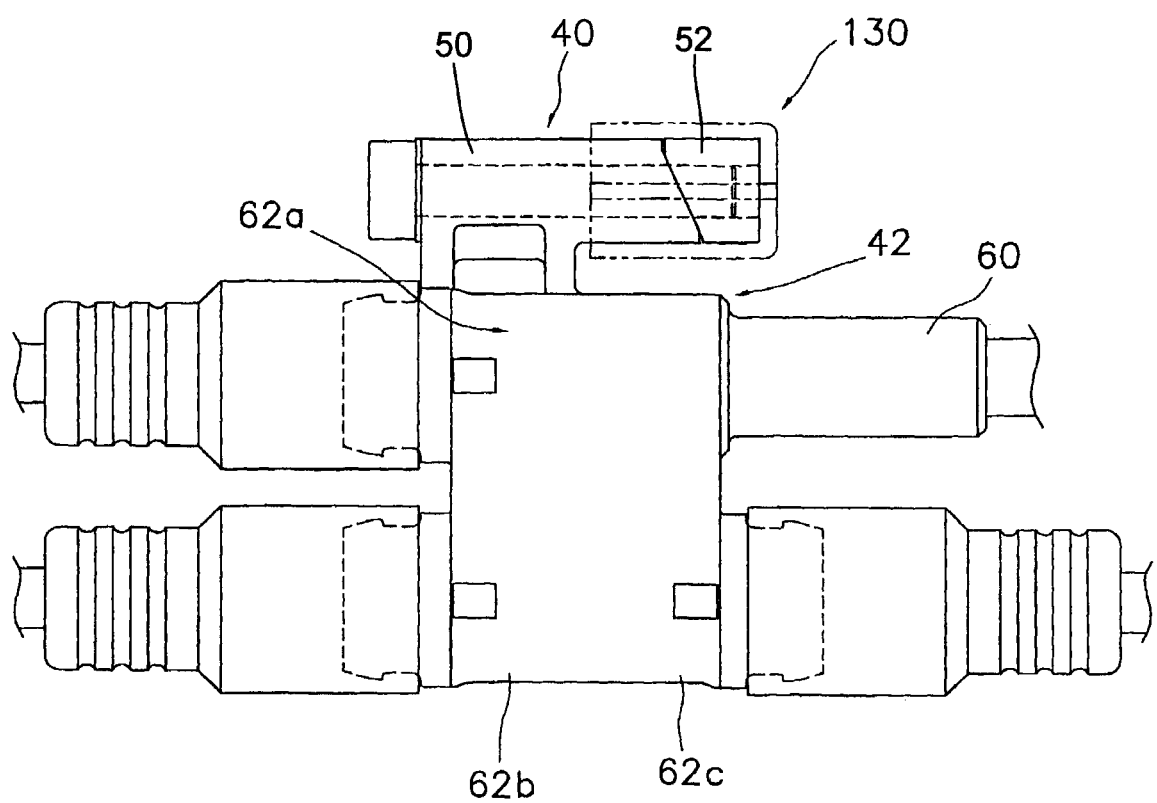
FIG. 5 is a side view of another embodiment of a wiring connector apparatus.

While the above is a description of various embodiments of inventive features, further modifications may be employed without departing from the spirit and scope of the present invention. For example, while only one connector case 62 was associated with mounting unit 40 in the above embodiment, a plurality of (e.g., three) connector cases 62a, 62b and 62c and associated contact cases (not shown) may be provided in a connector apparatus 130 as shown in FIG. 5. As in the previous embodiment, mounting unit 40 comprises a mounting portion 50 and a nut 52 that engages mounting portion 50 in the manner described for that embodiment. Connector portion 42 comprises a wire containment case 60 and three connector cases 62a, 62b and 62c, each having an associated contact case and contacts (not shown) similar to contact case 56 and contacts 58. In this embodiment, connector cases 62b and 62c are integrally formed with connector case 62a so that connector cases 62a, 62b and 62c are one piece. The shapes of the connector cases and contact cases, as well as the number of contacts mounted in each, are arbitrarily configured according to the number of wires in the wiring. The connector apparatus 130 thus configured may be fixed to frame 102 using outer casing receiver 102b, and may connect, for example, the shift control devices 121f and 121r with the front and rear electric drive devices 18f and 18r.

While connector apparatus 30 was fixed using outer casing receiver 102b provided on chain stay 102d, connector apparatus 30 may be placed at any location where an outer casing receiver is provided. While connector apparatus 30 was mounted to an outer casing receiver 102b that was welded in place. A suitable outer casing receiver may be attached to frame 102 in many ways, such as by adjustably fixing an outer casing receiver to the frame using screws.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle wiring connector apparatus for mounting to an outer casing receiver on a bicycle frame, wherein the outer casing receiver has an outer casing receiving opening, wherein the apparatus comprises:

a mounting portion structured to be mounted to the outer casing receiver; and a connector portion retained to the mounting portion and structured to retain an electrical connector.

2. The apparatus according to claim 1 wherein the mounting portion and the connector portion are one piece.

3. The apparatus according to claim 1 wherein the mounting portion is dimensioned to fit within the outer casing receiving opening.

4. The apparatus according to claim 3 further comprising a fastening unit that fastens the mounting portion within the outer casing receiving opening.

5. The apparatus according to claim 4 wherein the fastening unit creates a friction fit between the mounting portion and the outer casing receiver.

6. The apparatus according to claim 4 wherein the mounting portion includes an opening therethrough.

7. The apparatus according to claim 6 wherein the fastening unit includes:

a rotating member that extends through the opening; and a pressing member that moves outwardly relative to an outer peripheral surface of the mounting portion in response to rotation of the rotating member.

8. The apparatus according to claim 7 wherein the rotating member comprises a bolt, and wherein the pressing member includes an inclined surface that engages an inclined surface in close proximity to the opening.

9. The apparatus according to claim 1 wherein the connector portion includes a connector opening dimensioned to receive the electrical connector therein.

10. The apparatus according to claim 9 wherein the connector opening extends along a first axis, and wherein the mounting portion includes an opening that extends along a second axis substantially parallel to the first axis.

11. The apparatus according to claim 9 wherein the connector portion includes a retaining structure to axially retain the electrical connector.

12. The apparatus according to claim 11 wherein the retaining structure includes an opening through a side wall of the connector portion.

13. The apparatus according to claim 11 wherein the retaining structure comprises at least one of a projection or a recess.

14. The apparatus according to claim 13 wherein the retaining structure comprises a radially inwardly extending projection.

15. The apparatus according to claim 14 wherein the projection forms a stepped surface within the connector opening.

16. The apparatus according to claim 1 further comprising a plurality of the connector portions retained to the mounting portion and structured to retain a plurality of electrical connectors.

17. A bicycle wiring connector apparatus for mounting to an outer casing receiver on a bicycle frame, wherein the outer casing receiver has an outer casing receiving opening, wherein the apparatus comprises:

electrical connector that includes an exposed electrical contact;

a mounting portion structured to be mounted to the outer casing receiver; and a connector portion retained to the mounting portion and structured to retain the electrical connector.

18. The apparatus according to claim 17 wherein the electrical connector includes a plurality of the electrical contacts.

19. The apparatus according to claim 17 wherein the connector portion includes a connector opening dimensioned to support the electrical connector therein, and wherein the connector portion includes a retaining structure to axially retain the electrical connector within the connector opening.

20. The apparatus according to claim 19 wherein the retaining structure includes an opening through a side wall of the connector portion.

21. The apparatus according to claim 19 wherein the retaining structure comprises a radially inwardly extending projection that forms a stepped surface within the connector opening.

22. The apparatus according to claim 1 wherein the connector portion is structured to retain the electrical connector at the connector portion.

23. The apparatus according to claim 22 wherein the connector portion is structured to retain at least one of an electrical plug or an electrical socket.

24. The apparatus according to claim 17 wherein the connector portion is structured to retain the electrical connector at the connector portion.

25. The apparatus according to claim 24 wherein the connector portion is structured to retain at least one of an electrical plug or an electrical socket.

* * * * *